United States Patent [19]

Koob

[11] 4,326,632
[45] Apr. 27, 1982

[54] TWO-COMPONENT ADHESIVE BODY

[75] Inventor: Friedrich Koob, Munich, Fed. Rep. of Germany

[73] Assignee: Hilti Aktiengesellschaft, Fürstentum, Liechtenstein

[21] Appl. No.: 102,458

[22] Filed: Dec. 11, 1979

[30] Foreign Application Priority Data

Dec. 14, 1978 [DE] Fed. Rep. of Germany ....... 2854094

[51] Int. Cl.$^3$ .......................... B65D 25/08; B32B 7/10
[52] U.S. Cl. .................................... 206/389; 206/219; 206/412; 156/193; 427/208; 427/209; 428/268; 428/285; 428/537; 428/906; 405/261
[58] Field of Search ................ 427/208, 209; 206/411, 206/389, 219, 412; 428/354, 906, 40, 343, 124, 77, 36, 98, 174, 37, 268, 285, 537; 156/193; 405/261

[56] References Cited

U.S. PATENT DOCUMENTS 3,193,438  7/1965  Schafer .......................... 428/906 X
3,351,515  11/1967  Muttera .......................... 428/906 X
3,645,386  2/1972  Takaichi et al. ................ 428/906 X

FOREIGN PATENT DOCUMENTS 1816127  3/1970  Fed. Rep. of Germany ...... 427/209

*Primary Examiner*—Marion McCamish
*Assistant Examiner*—Alexander S. Thomas
*Attorney, Agent, or Firm*—Toren, McGeady & Stanger

[57] ABSTRACT

A cylindrically shaped body of a two-component adhesive material includes at least one web wound spirally around a central axis so that the web forms a number of overlapping layers in the radical direction of the body. The two-component adhesive material includes a resin component and a hardener component. A layer of each component is coated on the web. When the web is wound it separates the layers of the two different components so that they do not intermix. The cylindrical body can be laterally enclosed in a sheath and/or its transverse ends can be capped or coated to prevent intermixing of the components.

14 Claims, 6 Drawing Figures

TWO-COMPONENT ADHESIVE BODY

SUMMARY OF THE INVENTION

The present invention is directed to a two-component adhesive material body including a spirally wound web or sheet material which is coated with the adhesive components.

As compared to conventional expansion dowels, two-component adhesive material anchor bolts have significant advantages and, therefore, are used to an increasing extent in the fastening techniques utilized in various fields of attachment applications. A significant advantage of adhesive material anchor bolts resides in the fact that no spreading pressure is required in the borehole and, therefore, the anchor bolt can be mounted in materials having a low compressive strength or in locations where the anchor bolt is positioned a short distance from an edge.

One significant problem in known adhesively secured anchor bolts involves the practical packaging of the adhesive components. The adhesive material usually consists of two components which must be intermixed for effecting the adhesive action. During transport and storage, these components should be separated from one another by a sheath or cover which is as insensitive to destruction as possible, however, resistance to destruction of the sheath should not be too great and the diameter of the borehole should not be too large. Another problem in the use of such anchor bolts is in achieving a sufficient mixing of the adhesive material components within the borehole.

Instead of using conventional destructible containers, such as glass or plastic containers, it has been proposed to separate the adhesive material components into very small partial amounts and to enclose these partial amounts in so-called microcapsules having a range of diameters from 0.3 to 1.2 mm. It has also been known to coat a web material with such microcapsules and to wind the web spirally around itself to form a cylindrical body of a certain diameter. Microencapsulation, however, is a very expensive process and, as a result, is not at the present time extensively used in fastening or attachment techniques employing such adhesive materials.

Therefore, it is the primary object of the present invention to provide a two-component adhesive body which can be easily manufactured and affords a sufficient preliminary distribution of the adhesive components within the adhesive body.

In accordance with the present invention, the individual adhesive components are arranged as alternating layers on a spirally wound web material with the web material separating adjacent layers of different components.

Further, in accordance with the present invention, in addition to providing a carrier or support function, the web material also separates the components from one another. Additionally, the web material may be arranged so that it also serves as a sheath for the adhesive body.

As a rule, adhesive bodies embodying the present invention are stored for a period of time between manufacture and use. To prevent any premature interaction of the two components, it is advantageous if the web material is impermeable to each of the components. The web material can be selected based upon the consistencies of the two components. By way of example, plastics material sheets, glass fiber webs, fibrous webs, fabrics or papers can be used as the web material. In certain applications, impregnated papers can be utilized, such as oiled paper. Since the web material serves as a filler when the fastening or attachment operation is accomplished, fibrous materials, such as paper, fabrics or fibrous webs are especially suitable.

When the adhesive material consists of flowable components, these components can be prevented from flowing out of the transverse end faces of the body or from the longitudinal seam extending in the axial direction of the body by utilizing a sheath for at least partially coating the exterior of the body. Such a sheath should be impermeable to the components utilized. The external sheathing can be applied, for example, by spraying the cylindrically shaped body with a liquefied material or by dipping it into the liquified material. Such a sheathing or coating prevents any reaction of the components with the atmosphere. Depending on the properties of the components of the adhesive material, a coating of a plate-shaped filler material may be used, such as talcum. Moreover, instead of placing a coating over the components, a prefabricated cap can be placed on the transverse end of the cylindrical body. In addition, a shrunk-on foil could also be used.

An advantageous method of producing an adhesive body in accordance with the present invention resides in applying a different one of the components of the adhesive material on each of the face surfaces of the web material. Two sections of the web material coated in this manner are placed one on top of the other so that the same component on each section are in contact with one another. Subsequently, the two web material sections are rolled or wound around a central axis to form a cylindrical body of a certain diameter. In the wound arrangement the layers of the cylindrical body are disposed in a spiral arrangement. The components may be coated on the web material in a suitable coating plant through which the web material travels continuously. Since web material sections coated on each face surface are placed one on top of the other, the thickness of the layer of the individual components is doubled so that a thinner layer of each component can be applied to the web material. If one of the components is not self-adherent, this component can also be applied to the web material by means of a binding agent. The adhesive material components are uniformly distributed within the adhesive body by the winding or rolling operation. This uniform distribution of the adhesive material components facilitates the mixing of the components when the cylindrical body is set in place for use.

For an economical production of the adhesive body, it is advantageous if a web material is folded over upon itself so that the same components on different portions of the web material contact one another. Such an operation facilitates the coating of a larger area of the web material in a single working step, thereby significantly increasing the output of the operation. It is especially advantageous if the fold extends in the feed direction of the web material. Accordingly, the coating and folding of the web material can be carried out in a continuous process. Furthermore, folding of the web material provides an edge enclosure preventing one of the adhesive material components from escaping along one longitudinally extending side of the web material. Moreover, by means of this folding operation, the face surfaces of the web material coated with the same component are automatically placed one on the other.

In certain types of adhesive components, the coating of a web material on both of its face surfaces may pose difficulties. In such cases, it is advantageous if each component is applied on a separate section of web material with the sections of web material coated in this manner placed one on top of the other. In this arrangement, the coated side of one section of web material is placed in contact with the uncoated side of the other section of web material. Subsequently, the two sections of web material are wound around a central axis to form a cylindrical body having a selected diameter. In such an arrangement, the thickness of the adhesive material coated on the web material corresponds to the thickness of the individual layers of the adhesive material components in the adhesive body. Coating the web material on only one side has the additional advantage, when the web material is wound to form the adhesive body, that the uncoated side of one section of web material is arranged facing outwardly. In such an arrangement, an additional exterior coating to protect the adhesive material components is unnecessary, at least on the periphery of the adhesive body. If the adhesive material components are flowable, however, it is advantageous to coat the transverse end faces of the body.

For an economical production of the adhesive body, it is advantageous if the web material is wound as a continuous unit so that a plurality of the cylindrical bodies can be subsequently cut to the desired size from the single unit. Accordingly, the width of the web material wound to form the single unit of the adhesive body is a multiple of the length of the individual adhesive bodies subsequently cut from it. Since, in principle, it is not more expensive to wind up a wide width than a narrow width, the capacity of a production plant can be significantly increased in this manner. Furthermore, it is possible to cut the individual adhesive bodies to length only when they are to be used. Therefore, the specific length of the adhesive body can be determined by the user himself in accordance with the conditions prevailing when the adhesive body is to be used.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
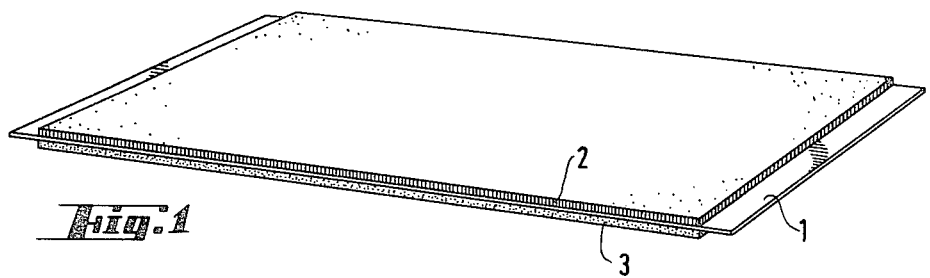
FIG. 1 illustrates a web material coated on each of its face surfaces with a different adhesive component.

In FIG. 1, a web material 1 is shown having two face surfaces and two edge surfaces extending in the longitudinal direction of the web. As viewed in FIG. 1 the upwardly directed face surface is coated with a resin component 2 while the downwardly directed face surface is coated with a hardener component 3. The resin component 2 and the hardener component 3 are the components of an adhesive material which, when mixed together, form a hardenable adhesive substance. The coating operation may be carried out in individual steps on a suitable planar piece of web material or it can be carried out in a continuous process onto a rolling section of the web material.

Figures 2, 3:
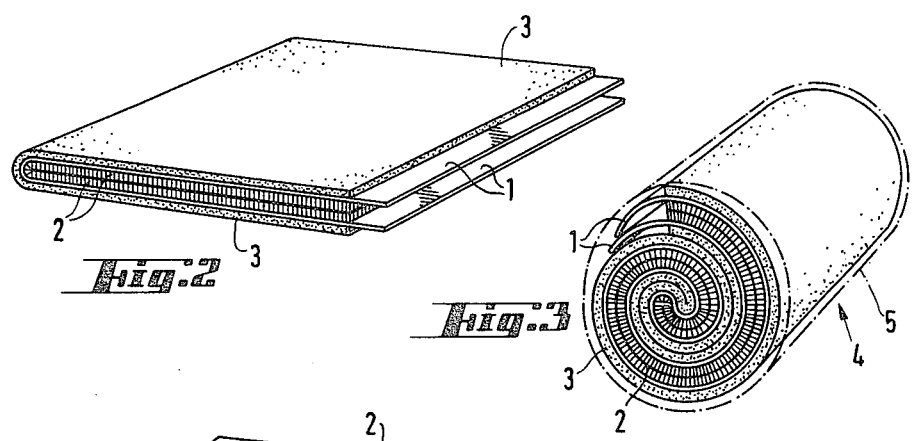
FIG. 2 shows the web material of FIG. 1 folded over upon itself.
FIG. 3 is a perspective view of the web material coated on both of its face surfaces spirally wound to form an adhesive body.

Web material 1, coated on each of its opposite face surfaces with a different component of the adhesive material, can be placed one on top of the other so that the face surfaces coated with the same component are placed against one another. As illustrated in FIG. 2, the coated section of web material 1 shown in FIG. 1, is folded over upon itself so that the face surfaces coated with the resin component 2 face toward one another and the layers of resin component contact one another. With such a procedure it is practically impossible for the coated sections of web material 1 which are placed on top of one another to be incorrectly positioned relative to one another.

In FIG. 3, the web materials coated on each side with a different adhesive material component and placed one on top of the other are rolled to form a cylindrical body of a selected diameter. As viewed in the radial direction of the body 4 from the central axis about which the web material is wound, the adhesive components 2, 3 are arranged in an alternating sequence and are separated from one another by the web material 1. To protect the components 2, 3 and to improve handling, the entire body 4 is sheathed by a coating 5 of a material which is impermeable to the components 2 and 3. The sheathing 5 is shown in phantom. It can be seen in FIG. 3 that the hardener component 3 forms the outer surface of the wound body. Coating 5 can be applied, for example, by dipping the wound body 4 into a suitable liquified material or it may be applied in the form of a shrunk-on foil.

Figure 4:
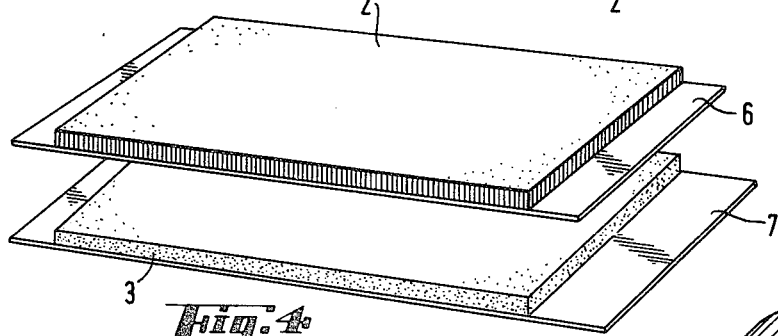
FIG. 4 illustrates two sections of web material each coated on a single face surface with a different one of the adhesive components.
Figures 5, 6:
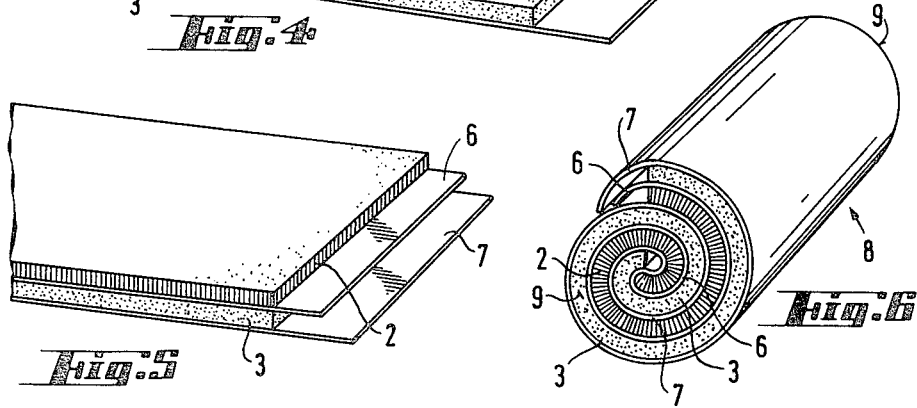
FIG. 5 shows two sections of web material each coated on one face surface with the web sections placed one on top of the other.
FIG. 6 is a perspective view of two sections of web material each coated on one surface shown spirally wound to form a cylindrical adhesive body.

In FIG. 4, two sections of web materials 6, 7 are each coated on one side, one with the resin component 2 and the other with the hardener component 3. As viewed in FIG. 4, the upper web material section 6 is coated with the resin component 2 while the lower web section 7 is coated with the hardener component 3. After the sections of web materials 6, 7 are coated, as shown in FIG. 5, one is placed on top of the other so that the uncoated side of the section 6 bears against the coated side of the section 7. With regard to production techniques, the coating of only one face surface or side of the web material sections 6, 7 is somewhat simpler. Contrary to the embodiment shown in FIGS. 1, 2 and 3, however, in this embodiment the components 2 and 3 of the adhesive material must be applied with the thicknesses desired in the finished body.

In FIG. 6, the web material sections 6, 7 each coated on one face surface only and with the coated face surfaces directed in the upward direction, are wound as shown in FIG. 6 to form a cylindrical adhesive body 8. Since the web material sections 6 and 7 are coated on one face surface only, the body 8 can be spirally wound in such a manner that the uncoated surface of the web material section 7 faces outwardly. In such an arrangement, an additional coating on the cylindrical body is not required. In certain cases, however, it is useful to provide a seal or closure over the two transverse end faces 9 of the cylindrical body. The seal or closure for the transverse end faces can be provided by spreading a plate-shaped filler material, such as talcum, or by applying a cap, a lacquer or a shrunk-on foil.

What is claimed is:

1. An adhesive body for securing an anchor bolt within a borehole comprises at least one web material section wound around itself about a central axis so that from the central axis radially outwardly said web material section is in overlapping relationship to itself, wherein the improvement comprises an adhesive material including a resin component and a hardener component, said resin component and hardener component each coated directly on said at least one said web forming a layer of each said component on said at least one web with said at least one web forming the sole separating layer between said component layers so that said resin and hardener components are maintained in separated relation for preventing intermixing of said components prior to use of the adhesive body for securing an anchor bolt within a borehole, and said web material being folded over upon itself so that a double layer of said component of adhesive material is located between the doubled over section of said web material.

2. An adhesive body, as set forth in claim 1, wherein said body has a generally cylindrically shaped exterior configuration.

3. An adhesive body, as set forth in claim 2, wherein said at least one web material section comprises a single web material section with each of its opposite face surfaces coated directly with a different one of said adhesive material components.

4. An adhesive body, as set forth in claim 2, wherein a sheath at least partially encloses the cylindrically shaped said body and said sheath being impermeable to said resin and hardener components.

5. An adhesive body, as set forth in claim 1, wherein said at least one web material section comprises two web material sections, each said web material section having a different said adhesive material component coated directly on one face surface thereof with the other face surface thereof being uncoated, and said two sections of web material being placed one on top of the other so that the uncoated surface of one contacts the coated surface of the other forming in a series layer arrangement a first web material section, a layer of one of the adhesive material components, a second web material section and a layer of the other one of the adhesive material components.

6. An adhesive body, as set forth in claim 1, wherein said web material is formed of a material impermeable to said resin and hardener components.

7. An adhesive body for securing an anchor bolt in a borehole comprising at least one web material section, a two-component adhesive material comprising a resin component and a hardener component, wherein the improvement comprises that said resin component and hardener component are coated in layers directly on said at least one web in separated relationship so that said web is in direct contract with and separates said components whereby they do not intermix, said web section and said resin and hardener component layers are wound around a central axis forming a generally cylindrical body of alternating layers of said web, said resin component, and said hardener component with said layers wound in overlapping spiralling relation and with said at least one web section separating said resin and hardener components so that prior to the insertion of an anchor bolt into the adhesive body for mixing said resin and hardener components the components are separated from one another only by said web section, said web section has two longitudinally extending face surfaces and two longitudinally extending edge surfaces, said resin component coated on one of said face surfaces and said hardener component coated on the other said face surface, and said web section being wound so that at least the layer of one of said components contacts the same layer of said component as said web section is spirally wound.

8. An adhesive body, as set forth in claim 1, wherein said web is formed of a material impermeable to said resin and hardener components.

9. An adhesive body, as set forth in claim 8, wherein said web section is formed of one of the group consisting of a plastics material sheet, a sheet material formed of glass fibers, a sheet material formed of a fibrous material, a fabric and a paper.

10. An adhesive body, as set forth in claim 9, wherein said web section is formed of an impregnated paper.

11. An adhesive body, as set forth in claim 10, wherein said web section is formed of an oiled paper.

12. A method of forming an adhesive body for use in securing an anchor bolt in a borehole comprising directly coating separate face surfaces of a web material each with a different component of a two-component adhesive material, winding the web material around a central axis with the web material being wound around itself in an outwardly spirally arrangement and with the web material separating adjacent layers of different adhesive material components, folding the web material over upon itself so that the same component of adhesive material is located between the folded over face surfaces of the web material section and winding the web to a selected outside diameter.

13. A method of forming an adhesive body for use in securing an anchor bolt in a borehole comprising applying a coating of a different one of the adhesive material components to one surface of two separate sections of web material so that each section is coated on one face surface and is uncoated on the other face surface, placing one of the coated web sections on top of the other coated web section so that the coated face surface on one contacts the uncoated face surface on the other, and winding the two coated material sections to a select outside diameter so that each said layer of the coated adhesive material is separated from the other said layer by a web material section.

14. A method, as set forth in claim 12 or 13, including the step of winding the web about a central axis extending in the long direction of the web for forming a continuous cylindrical body, and cutting the continuous cylindrical body into the desired size of adhesive body to be employed.

* * * * *